United States Patent [19]

Wrobel

[11] Patent Number: 5,258,672

[45] Date of Patent: Nov. 2, 1993

[54] AXIAL RETAINING MEANS FOR THE ROTOR SHAFT OF AN ELECTRIC MOTOR

[75] Inventor: Günter Wrobel, Villingen, Fed. Rep. of Germany

[73] Assignee: Papst-Motoren GmbH & Co. KG, Black Forest, Fed. Rep. of Germany

[21] Appl. No.: 737,767

[22] Filed: Jul. 30, 1991

[30] Foreign Application Priority Data

Jul. 30, 1990 [DE] Fed. Rep. of Germany ... 9011187[U]

[51] Int. Cl.⁵ .................... H02K 15/14; H02K 7/08
[52] U.S. Cl. ........................................ 310/42; 310/90
[58] Field of Search ............. 310/42, 40 MM, 43, 90, 310/67 R, 91

[56] References Cited

U.S. PATENT DOCUMENTS

| | | | |
|---|---|---|---|
| 2,471,180 | 5/1949 | Wightman | 310/42 |
| 3,726,575 | 4/1973 | Moorman | 308/135 |
| 3,772,544 | 11/1973 | Wrobel | 310/71 |
| 3,961,864 | 6/1976 | Papst et al. | 417/354 |
| 4,074,158 | 2/1978 | Cole | 310/90 |
| 4,128,364 | 12/1978 | Papst et al. | 417/354 |
| 4,164,690 | 8/1979 | Müller et al. | 318/254 |
| 4,336,470 | 6/1982 | Gutris | 310/42 |
| 4,429,245 | 1/1984 | Müller et al. | 310/261 |
| 4,455,498 | 6/1984 | DeSisto | 310/42 |
| 4,613,778 | 9/1986 | Wrobel et al. | 310/90 |
| 4,703,209 | 10/1987 | Wrobel | 310/67 R |
| 4,944,610 | 7/1990 | Berg | 384/147 |

Primary Examiner—Steven L. Stephan
Assistant Examiner—D. R. Haszko
Attorney, Agent, or Firm—Fitch, Even, Tabin & Flannery

[57] ABSTRACT

Axial retaining ring is provided for a free end of a rotor shaft of an electric motor having a rotor, with a first stop element on one of the shaft or the rotor and a second stop element in the form of a retaining ring which, during assembly of the motor, is fitted onto the free end of the rotor shaft and is secured by engaging in a circular recess on the shaft free end, both stop elements of the rotor acting between two stationary stop faces of the electric motor and fixing the axial position of the rotor. The retaining ring is constructed in the form of a resilient pushbutton fittable in the axial direction onto the shaft end and the retaining ring having generally axially directed resilient retaining arms that engage in the circular recess provided in the shaft end.

11 Claims, 3 Drawing Sheets

AXIAL RETAINING MEANS FOR THE ROTOR SHAFT OF AN ELECTRIC MOTOR

The invention relates to an axial retaining means for the rotor shaft of an electric motor, with a first stop element on the shaft or on the rotor and a second stop element in the form of a retaining ring which, during assembly, is fitted onto the free end of the rotor shaft and is secured by engaging in a circular recess on the shaft end, both stop elements of the rotor acting between two stationary stop faces of the electric motor and fixing the axial position of the rotor.

DE-OS 32 13 418 discloses an electric motor with sleeve bearings, in which the rotor shaft is fixed in its axial position in that on the one hand the rotor hub engages by means of a steel thrust ring on the face of a stationary bearing part (sleeve bearing) and on the other hand is supported by means of a retaining ring inserted in a recess and a compression spring on a second thrust ring, which presses against a stationary part of the motor (sleeve bearing). It is also known from this literature reference to replace the first support by means of the rotor hub to support the end of the shaft on a plastic stop disk, the end being rounded to reduce frictional forces. However, this known solution suffers from the disadvantage that the axial retaining means is costly from the material and labor standpoints, because a retaining ring must be inserted in a recess on the shaft end in a generally radial direction and, in addition, the compression spring and stop disk must be separately fitted on.

The problem of the present invention is to propose an axial retaining means for the rotor shaft of an electric motor, which is characterized by a small number of parts and therefore low costs, easy assembly and high precision.

In the case of an axial retaining means of the aforementioned type, this problem is solved in that the retaining ring is constructed in the form of a resilient pushbutton and is fittable in the axial direction onto the shaft end, and that the retaining ring has generally radially inclined resilient retaining arms, which engage in the circular recess of the shaft end.

In a preferred embodiment of such a solution, the retaining ring simultaneously forms the thrust ring and the axial retaining means, so that the retaining ring, during assembly, merely has to be fitted from the end in the axial direction onto the shaft end. This is more simple than a conventional retaining disk, which is radially inserted in a recess of the shaft end, and where beforehand other parts, such as a separate thrust ring, have to be fitted.

The retaining ring is preferably injection molded in one piece from plastic. Preferably, the retaining ring engages directly on the associated stationary stop face of the motor and forms a thrust ring. In this case, the retaining ring is made from a special plastic material, for example, synthetic resin granules sold under the trademark Polypenco (polyamide 6.6 with an addition of a plastic having lubricating properties sold under the trademark Molykote).

In a special embodiment the circular recess on the shaft end is constructed conically with a diameter decreasing towards the shaft end and to the recess is connected a retaining shoulder. The retaining arms of the retaining ring are adapted to the shape of the recess on the inside facing the shaft end and lock with their ends against the retaining shoulder. A particularly advantageous embodiment of the retaining ring is characterized in that it has a circular portion forming the second stop element and that the resilient retaining arms in the form of a slotted collar project generally axially from the side of the circular portion remote from the associated stationary stop face. The shaft end is preferably rounded for the easier engagement of the retaining ring. In such an axial retaining means combination, the retaining ring can be engaged with limited force on the shaft end and reliably lock against the retaining shoulder.

As is known, to reduce noise of the rotor shaft bearing support, it is possible to provide between the stationary stop faces and the bearing elements an elastic or resilient intermediate member for forming an axial, clearance-free support.

Further advantageous developments of the invention can be gathered from the subclaims.

The invention is described in greater detail hereinafter relative to three non-limitative embodiments and the attached drawings, wherein.

Figure 1:
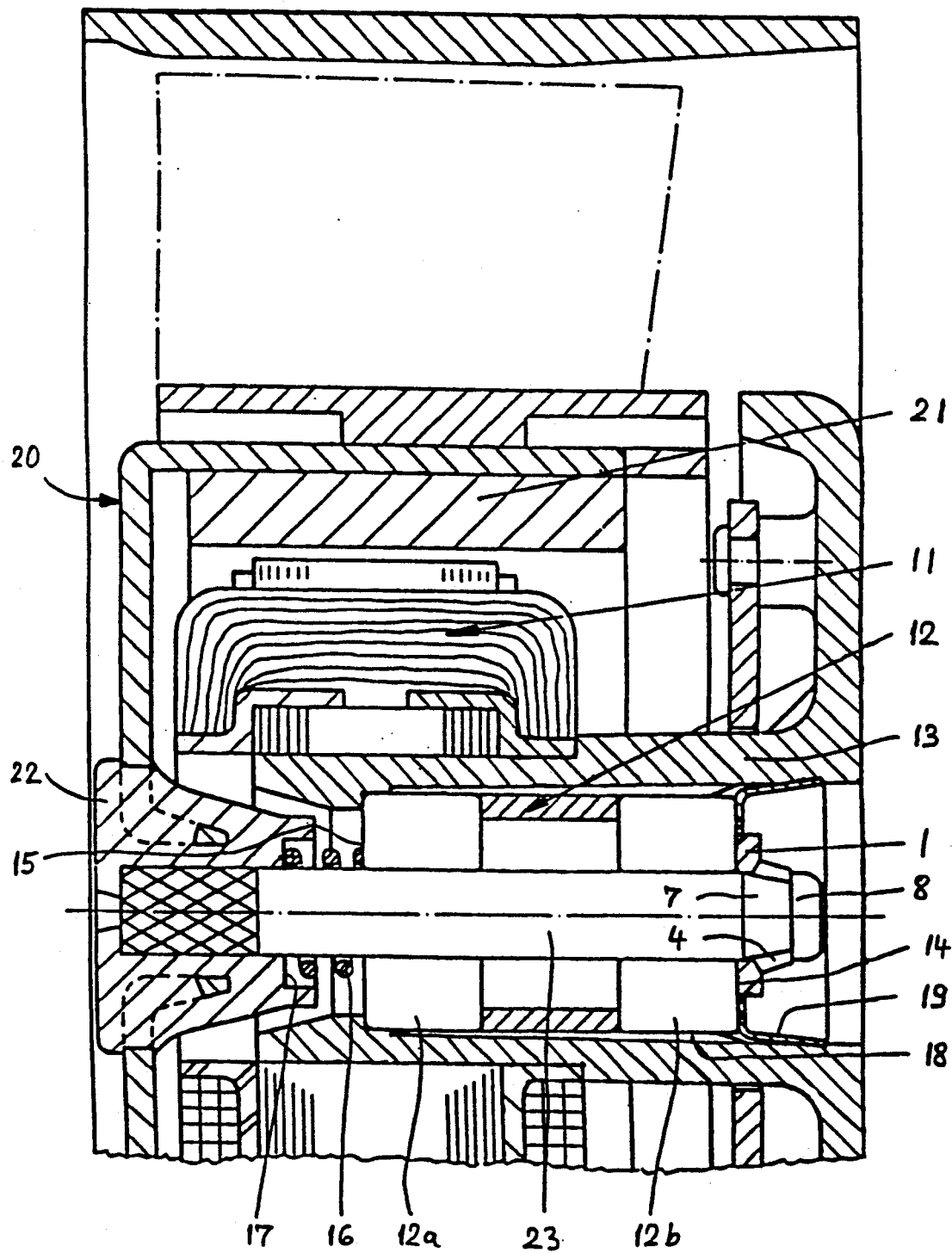
FIG. 1 is a cross-section through an electric motor with the inventive axial retaining means.

The electric motor shown in FIG. 1 is an external rotor-type motor, whose bearing system 12 comprises two spaced ball bearings 12a, 12b. An electric motor stator 11 has a bearing tube 13, in which are located the two ball bearings 12a, 12b fixed in position by a retaining clip 19. In the radial direction the ball bearings 12a, 12b are supported on longitudinal ribs 18 within the bore of the bearing tube 13.

A rotor 20, which carries a cylindrical permanent magnet 21, is fixed by means of a rotor hub 22 on a rotor shaft 23, which is mounted for rotation in the ball bearings 12a, 12b.

In the axial direction the rotor shaft 23 is supported on the one hand by means of a first stop element 17 (stop face) and a compression spring 16 with respect to a stationary stop face 15 (with respect to the shaft) on the inner race of the ball bearing 12a, while the other end of the rotor shaft 23, namely the shaft end 6 (see FIG. 4) carries a retaining ring 1, which is supported on a stationary stop face 14 (with respect to the shaft) on the inner ball race of the ball bearing 12b. It is also possible to replace the compression spring 16 by a different, elastic intermediate member, for example, by a thrust ring made from a suitable plastic material.

Figure 2:
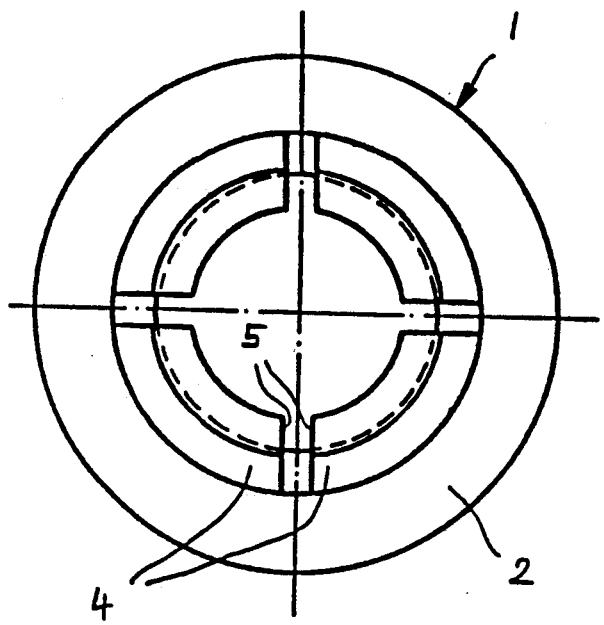
FIG. 2 is a plan view in the axial direction on a retaining ring for the electric motor according to FIG. 1.
Figure 3:
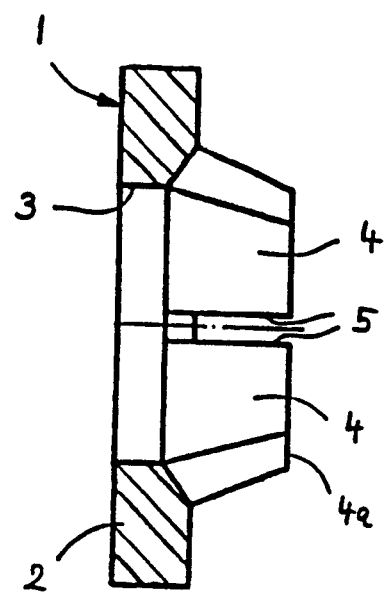
FIG. 3 is a longitudinal section through the retaining ring according to FIG. 2.
Figure 4:
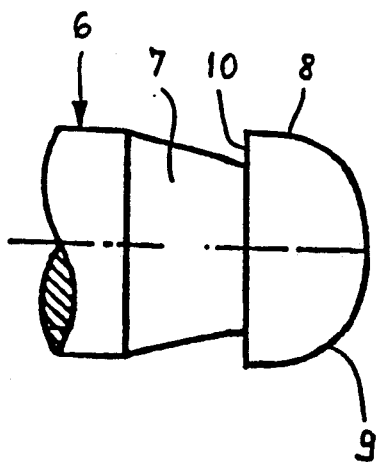
FIG. 4 shows the shaft end of the electric motor according to FIG. 1.

Details of the axial retaining means can be seen in FIGS. 2 to 4. The shaft end 6 is provided with a conical recess 7, whose diameter decreases towards the end. To this recess 7 is connected an end portion 8, accompanied by the formation of a retaining shoulder 10, and which is provided with a rounded portion or surface 9.

As can also be gathered from FIG. 1, on the shaft end 6 can be fitted the retaining ring 1 in the axial direction. The retaining ring 1 has a circular portion 2, which rests with a bore 3 in the transition region between the shaft end 6 and the conical recess 7 and simultaneously forms a thrust ring, which is located on the face 14 as a stationary stop face of the ball bearing 12b. A plurality of retaining arms 4 project generally axially from the opposite face of the circular portion 2. These retaining arms 4 are integrally formed onto the circular portion 2 and are separated from one another by slots 5, so that they can spring elastically. The insides of the retaining arms 4 are adapted to the form of the conical recess 7, and the end faces 4a of the retaining arms 4 are supported against the retaining shoulder 10. On fitting the retaining ring onto the shaft end 6, the rounded surface 9 of the latter facilitates a slight elastic expansion of the retaining arms 4 for subsequent engagement in the recess 7.

In the embodiment according to FIG. 1, the retaining ring 1 serves both as a retaining ring and as a thrust ring. Thus, during assembly, only a single part has to be fitted in order to bring the rotor shaft 23 into an axially secured position.

Figure 5:
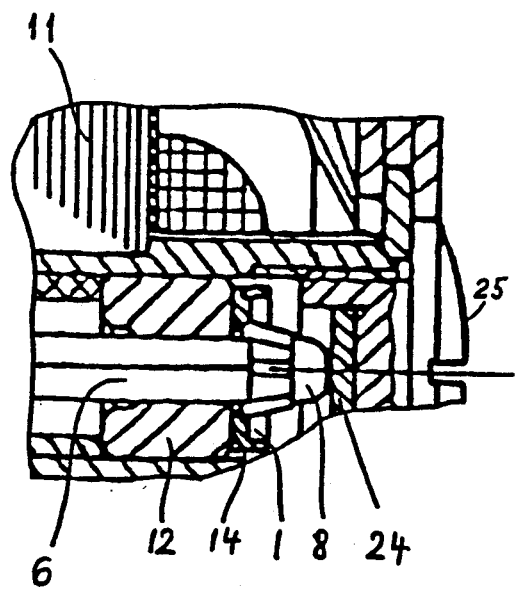
FIG. 5 is a detail of an alternative embodiment of an electric motor with the inventive axial retaining means.

Whereas in the embodiment according to FIG. 1 the bearing system is constituted by two ball bearings 12a, 12b, the axial retaining means according to the invention can be used in conjunction with other bearing types, such as plain or sleeve bearings. FIG. 5 shows such an embodiment. The shaft end 6 is mounted in a sleeve bearing 12c and the axial position is fixed by the retaining ring 1, which engages on a stationary stop face 14 on the sleeve bearing 12c. The axial position is also fixed by the end portion 8 of the shaft end 6 running onto a stop disk 24.

The material for the retaining ring 1, which also serves as a thrust ring, is preferably a plastic having a lubricant addition, for example, synthetic resin granules sold under the trademark Polypenco (polyamide 6.6 with an addition of a plastic having lubricating properties sold under the trademark Molykote).

The retaining ring 1 and the shaft end 6 are of similar design, as described in connection with FIGS. 2 to 4. More specifically, at the contact surfaces they fit positively together with, respectively, their inner and outer surfaces as hollow cone or conical shaped units.

In FIG. 1 the spring 16 presses the retaining ring 1 against the race surface 14, and the round surface 9 does not contact anything. By contrast, a minimum axial play is present in FIG. 5. There the round surface 9 of the shaft 6/8 abuts a disk 24 in a type of point-bearing, which is held in an axially adjusted position via the central screw 25. FIG. 1 shows a DC motor. FIG. 5 is intended for an AC motor (alternating current motor) and has a pair of sleeve bearings. The spring action, as just described for FIG. 1, can also be obtained for permanent magnet motors (DC motors) with the rotor-permanent magnet by positioning it axially so that it is offset axially somewhat to the stator 11, for example, as shown also in FIG. 1. The permanent magnet rotor pulls itself into an axial position as is known, where the axial forces between rotor magnet and inner stator plate stock are in balance. Accordingly, possibly the first stop member or the second stop face can be replaced because of the action of the magnetic field force providing for an axial preferred position with a return bias force like a spring. This is generally true when the axial middle of the stator core, $Z_{st}$ in FIG. 6, and the axial middle of the rotor magnet, $Z_R$ in FIG. 6, stand opposite each other. The offset, as shown in FIGS. 1 and 6, causes a certain axial, magnetic pull of the retaining ring 1 against a surface 42 (FIG. 6).

Figure 6:
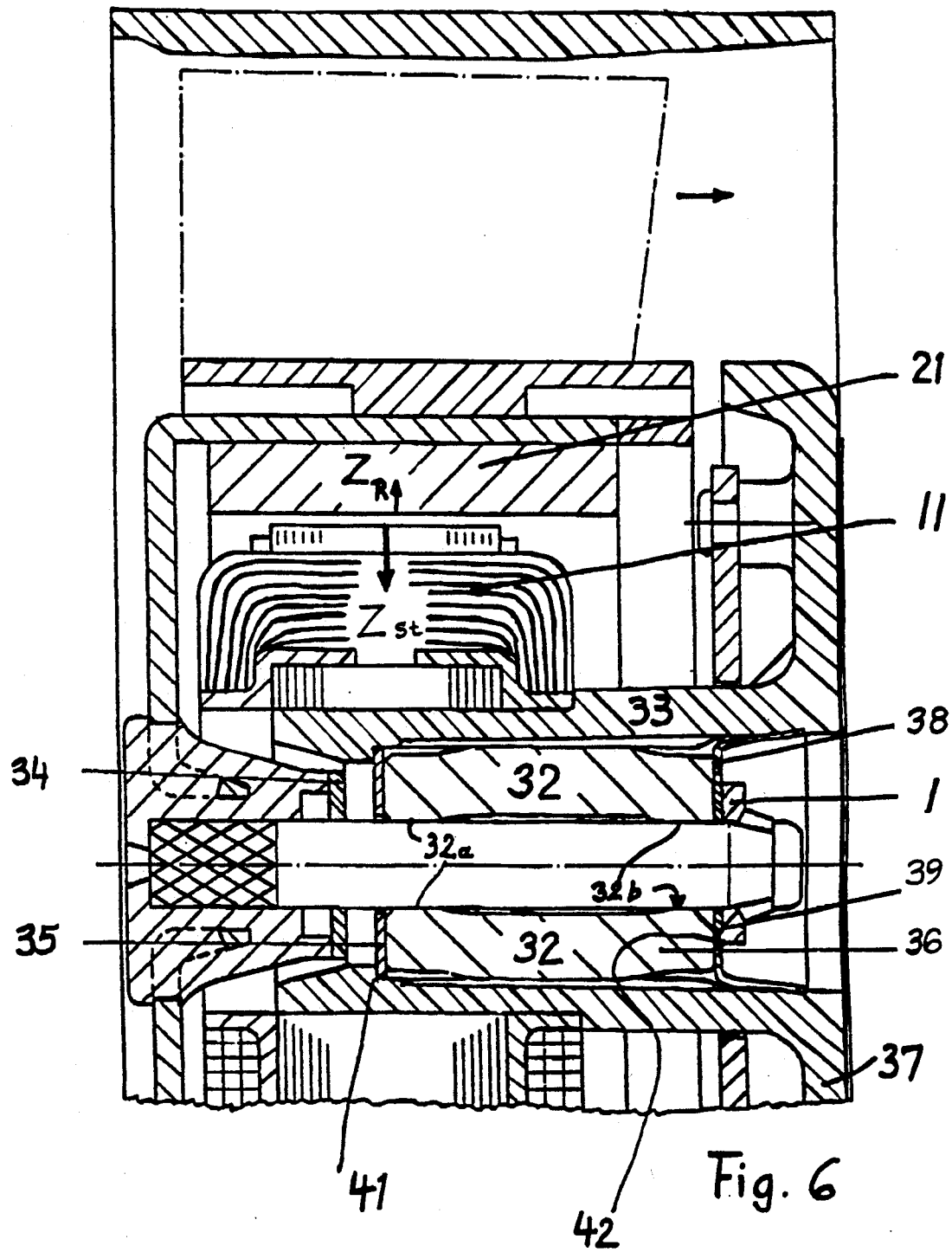
FIG. 6 is a fragmentary cross-sectional view of the electric motor with another alternative arrangement.

Thus, an alternative configuration to FIG. 5 for a DC air exhaust motor could be designed so that a single-piece sintered bearing element 32, as shown in FIG. 6, with two axially offset slide bearing surfaces 32a, 32b, is inserted into a bearing tube 33 up to stop 41; the contact 42 of the retaining ring 1 according to the invention is provided on the one front side of the sleeve bearing by an appropriately axially positioned rotor magnet 21. If as shown in FIGS. 1 and 6, the central motor is mounted via the single-piece flange 37 connected to the bearing support tube 13/33 at the right axial end of the motor by means of radially directed bars (not shown), then these bars should be located on the flow outlet side (pressure side) in the axial ventilator to reduce noise when operating in the low pressure range. Then, when in operation, an aerodynamic reaction force will be exerted on the rotor with impeller in the direction away from the bars, that is, to the left as viewed in FIG. 6. If the motor is mounted so that the rotor is suspended, then the rotor weight will be added to this effect, with the tendency to pull down the rotor/impeller. The ring 1 according to the invention is used to prevent this.

In addition to the difficulty just mentioned, it should be stressed that metal retaining rings made of spring steel can break in a shock test. Alternatively, for small shaft diameters less than 3 mm, so-called grip screws are known that are spring-tempered and relatively brittle, and are seated by friction on the shaft. After a drop test, they offer less security. A related device thus is not absolutely disposed radially into a groove of the shaft. The object of the invention is thus a single-piece plastic part designed as an abutment against a sleeve bearing front surface, or, alternatively, as stop-part against an axially stationary ball bearing ball race, and is formed preferably on the blunt shaft end as an axial retaining element, and, in particular, of a sprayable plastic suitable for mass production, which is wear-resistant, temperature-resistant, and sufficiently elastic.

FIG. 6 shows a bearing similar to FIG. 1 and with partly identical reference numbers, but with a sleeve bearing element 32 having steel washers 39, 35 provided on either end. These are used for better axial abutment, but are not absolutely necessary. $Z_R$ pulls to the left and touches the retaining ring 1 at the surface 42 that in general is against the bearing element 32.

If the rotor were to be forced strongly to the right due to extreme shaking during operation, then the plastic disk 34 on the rotor side would move at most up to the stop at disk 35 which has emergency bearing characteristics in any case.

The magnetic field nearly always prevents this, however, because it pulls the rotor more strongly to the left, like a spring being increasingly compressed. That is, the magnetic field force pulls the rotor back to the equilibrium position with regard to axial forces, where they are in balance.

What is claimed is:
1. An electric motor, comprising:
   a stator;
   a bearing system supported by the stator;
   a shaft mounted in the bearing system, the shaft having a free end and a mounting end, the free end provided with a circular recess;
   a rotor mounted on the mounting end of the shaft;
   two axially stationary stop faces provided on the electric motor;
   a first stop element on one of the shaft or the rotor; and a second stop element in the form of a one-piece retaining ring structured to be conformable to the circular recess on the free end of the shaft and engageable to a secured position therein by a simple telescoping action in the axial direction between the free end of the shaft and the second stop element during motor assembly, the one-piece retaining ring being in the form of a resilient pushbutton and having generally axially directed resilient retaining arms that engage in the circular recess to establish the secured position, both stop elements acting between the first and second axially stationary stop faces to fix the axial position of the rotor.

2. The motor according to claim 1, wherein the retaining ring is made from a plastic material.

3. The motor according to claim 2, wherein the retaining ring directly engages on one of the stationary stop faces and forms a thrust ring.

4. The motor according to claim 3, wherein the circular recess on the shaft end is constructed conically with a diameter decreasing towards the end and wherein a retaining shoulder is connected to the circular recess.

5. The motor according to claim 4, wherein the retaining arms of the retaining ring are adapted to the shape of the circular recess on the inside facing the shaft end and engage with their ends abutting the retaining shoulder.

6. The motor according to claim 5, wherein the retaining ring has a circular portion forming the second stop element, and wherein the resilient retaining arms projecting generally axially are in the form of a slotted collar from the side of the circular portion remote from the first stationary stop face.

7. The motor according to claim 6, wherein the end of the shaft end is rounded for the easier fitting of the retaining ring.

8. The motor according to claim 7, wherein an elastic or resilient intermediate member is placed between a stationary stop face of the motor and the bearing system for forming an axial, clearance-free support.

9. The motor according to claim 8, wherein the intermediate member is a compression spring positioned between the stop face of the motor of a stationary stop face on the associated bearing of the bearing system.

10. The motor according to any one of claims 1 or 2 to 7, wherein the bearing system is a sleeve bearing and the end of the free shaft end is axially supported on a stop disk as one of the stationary stop faces.

11. The motor according to any one of claims 1 or 2 to 9, wherein the bearing system includes ball bearings with inner and outer races.

* * * * *

UNITED STATES PATENT AND TRADEMARK OFFICE
CERTIFICATE OF CORRECTION

PATENT NO. : 5,258,672

DATED : November 2, 1993

INVENTOR(S) : Wrobel

It is certified that error appears in the above-identified patent and that said Letters Patent is hereby corrected as shown below:

IN THE CLAIMS:

Claim 9, Column 6, line 18, change "motor of a" to -- motor and a --.

Signed and Sealed this

Twenty-fourth Day of May, 1994

Attest:

BRUCE LEHMAN

Attesting Officer

Commissioner of Patents and Trademarks